United States Patent [19]

Jones et al.

[11] 4,045,584

[45] Aug. 30, 1977

[54] FOOD PRODUCT COATING APPARATUS AND METHOD

[75] Inventors: Richard E. Jones; Donald F. Jago, both of Duluth, Minn.

[73] Assignee: Jeno's, Inc., Duluth, Minn.

[21] Appl. No.: 742,624

[22] Filed: Nov. 17, 1976

Related U.S. Application Data

[62] Division of Ser. No. 618,905, Oct. 2, 1975.

[51] Int. Cl.² .............................................. B05B 3/02
[52] U.S. Cl. ................................ 426/289; 426/292; 118/24
[58] Field of Search ............... 426/289, 292, 295, 89, 426/96

[56] References Cited

U.S. PATENT DOCUMENTS

| 2,845,040 | 7/1958 | Ray | 426/289 |
|---|---|---|---|
| 2,865,766 | 12/1958 | Christianson et al. | 426/289 |
| 3,363,586 | 1/1968 | Jernigan et al. | 426/295 |

FOREIGN PATENT DOCUMENTS

| 2,258,131 | 8/1975 | France | 426/289 |

*Primary Examiner*—Jeanette M. Hunter
*Attorney, Agent, or Firm*—Daniel J. Meaney, Jr.

[57] ABSTRACT

A method of coating a surface of an article of food with a granular material at a selected density by transporting the food along a preselected path at a preselected speed, enclosing and agitating the granular material with a rotating auger, metering the granular material with height adjusting augers, while adjusting the height of the agitating auger, the orifice for metering the granular material and rotating the distributing auger at selected speeds to meter a selected quantity of food onto the food surface; reclaiming excess granular material and reconveying the excess back to the enclosed quantity.

2 Claims, 8 Drawing Figures

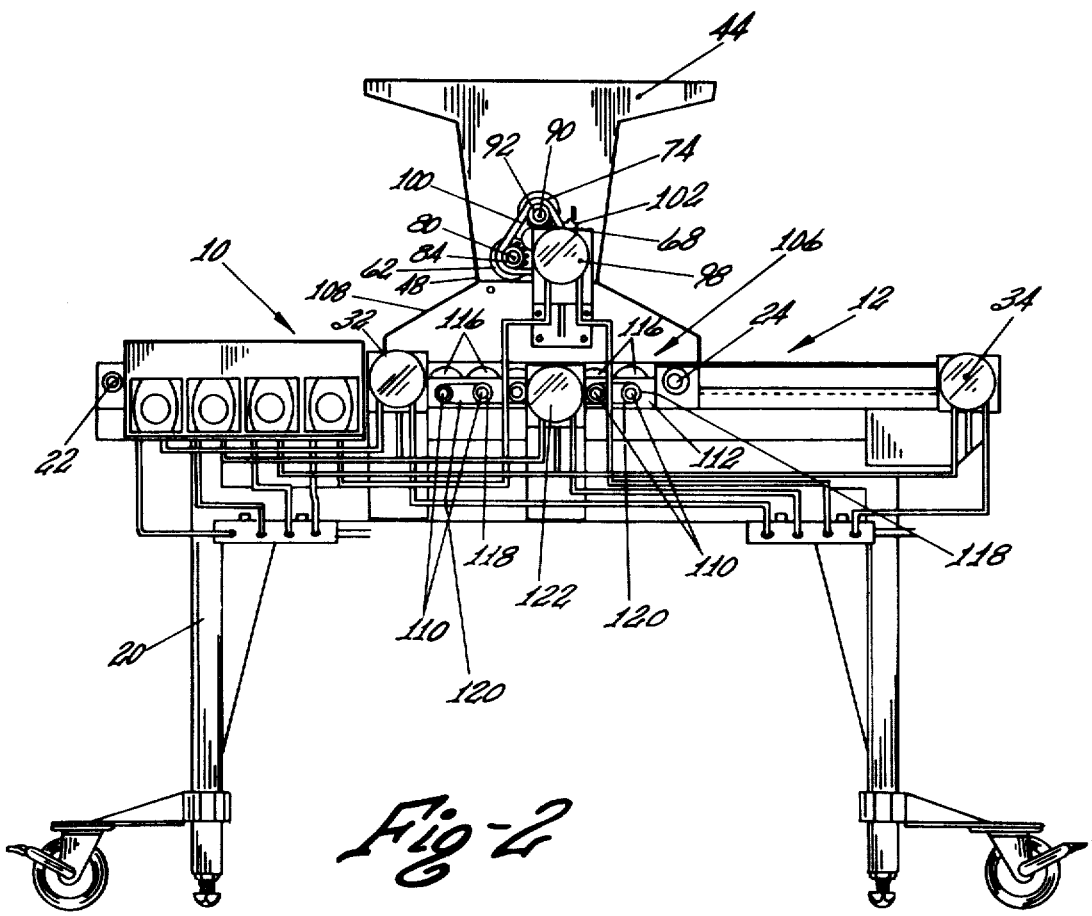
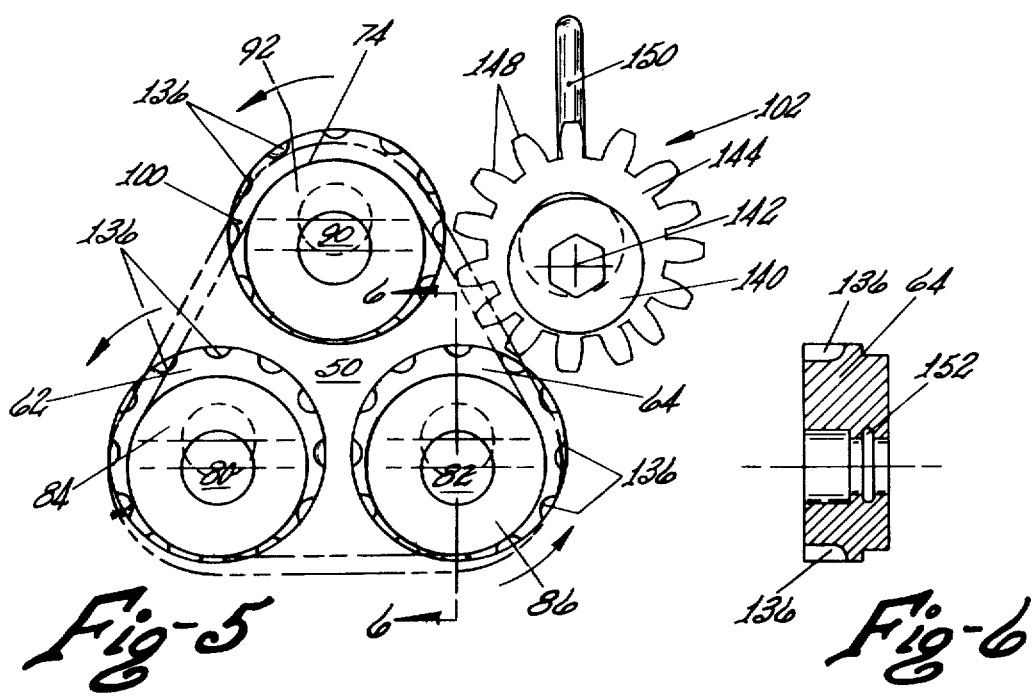

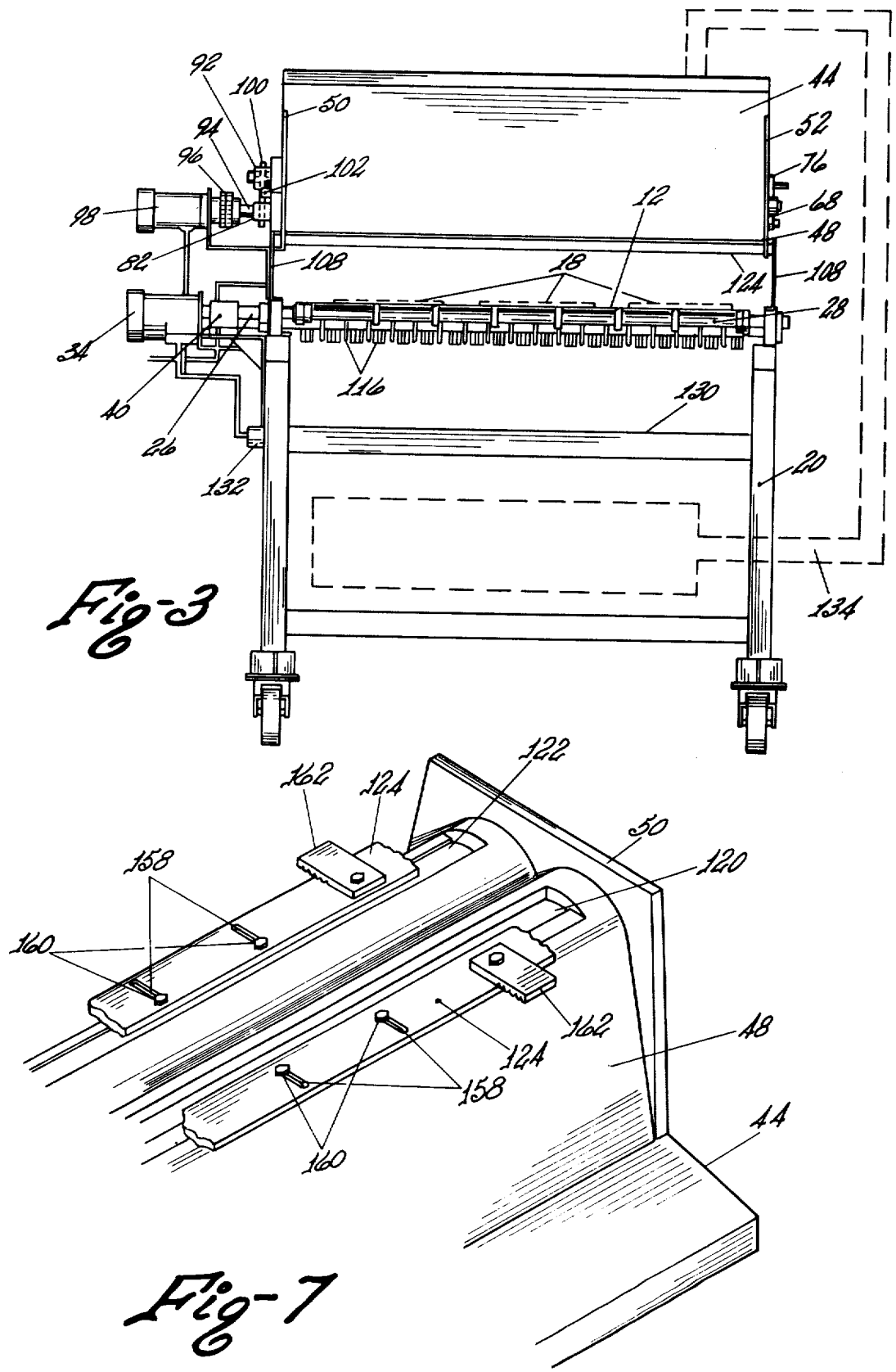

FOOD PRODUCT COATING APPARATUS AND METHOD

This is a division, of application Ser. No. 618,905, filed Oct. 2, 1975.

BACKGROUND OF THE INVENTION

1. Field of the Invention

This invention relates to a novel and improved apparatus and method for controllably and accurately distributing a selected density of granular material on to the surface of an article. In particular, this invention relates to an apparatus and distributor for coating an article of food with a granular food product at selected density. This invention has utility for a wide variety of applications. Any granular material of selected size can be distributed on a surface at a controlled weight. One application, but not necessarily the only such application, is for coating a granular food product onto an article of food; for example, coating shredded cheese, meat pieces or the like onto pizza shells or other such food article.

2. Description of the Prior Art

It is known in the prior art to utilize apparatus for distributing granular food material onto the surface of an article of food. One known granular food material spreader utilizes a separate lower hopper for storing or enclosing a shredded food material and an elevator conveyor for transporting the granular food material to a separate elevated hopper. Each hopper has an agitating system to prevent the granular food material from forming masses or clusters of food material. Photocell control system detect and control quantity levels of granular material in each hopper. A pin drum located at the bottom of the elevated hopper is rotated at a controlled variable speed to feed a continuous flow of granular material to the food article being coated. Excess product is reclaimed and returned to the lower hopper for recirculation.

Another known prior art device utilizes a vertically mounted, funnel shaped hopper assembly for distributing free flowing granular material such as bread crumbs, spices, etc. The orifice end of the funnel communicates with a conical-shaped nozzle which directs the granular material into a substantially uniform stream. A single vertically mounted auger extends from the orifice vertically into the center of the hopper and is rotatable therein to deliver free flowing material through the hopper orifice, into the nozzle and out of the assembly in a controlled directed stream. Such assembly has utility for filling container or the like with granular food material.

Other known food distributing apparatus utilize a horizontally pivotally mounted disc member which functions as a continuous motion filler to receive and convey food, such as blanched or frozen carrots, peas, beans or the like, from a hopper to a food line for packaging.

Another known device is similar in assembly but utilizes a pivotally mounted rotatable disc member to spread the granular material received from the hopper in a circular pattern onto a surface.

Certain known mixers and blenders utilize a pair of contrarotatable controlled speed augers to mix or blend food and transport the so blended food out of a mixing cavity through an orifice formed in the mixing cavity.

The known prior art devices have certain disadvantages. For example, the two hopper, pin drum distributor system results in the granular material being subjected to storage away from the actual distributing area and transportation of controlled quantities by a photocell control system to the actual distributing area. Further, it appears that the pin drum is positioned under the opening in the elevated hopper resulting in the metering of the granular material by deposition onto the pin drum surface and rotation of the material to the tangential point where the material falls off of the drum onto the article. The granular food material weight or density is controllable substantially by speed of drum rotation. The size, quantity and type of granular food material must be compatible with opening size, the spacing of the fixed rotatable drum below the opening and size and spacing of pins on the drum surface.

The vertically mounted hopper assembly is limited in application. Distribution of granular food material is in a substantial stream-like flow which generally cannot be used to coat granular material uniformly on the surface of an article of food.

Continuous motion fillers utilizing rotatable horizontally pivotally mounted disc members are generally limited in application to food fillers; that is, for depositing a metered volume of food in a package, tray or the like.

Similarly, spreaders or distributors having a conical shaped hopper terminating in a rotatable pivotally mounted disc member distribute granular material in generally uncontrollable density in a circular pattern. Controlled even densities are difficult to obtain and precisely control.

The known mixers and blender having contra-rotatable augers have a mixing cavity into which food ingredients to be mixed or blended are added in batches. During or after mixing or blending, the homogenous food mass is extruded or discharged in a stream out of an orifice in the mixing cavity. Such mixers or blenders are limited to distributing a concentrated homogenous mass of food material. Generally, the blended material is in the form of a food mass, cluster or high density stream apparatus for forming a homogenous or concentrated food mass and discharging the same through an outlet orifice is generally an unacceptable apparatus or method for controllably distributing granular food material at a selected density onto an article of food.

SUMMARY OF THE INVENTION

The apparatus and method of the present invention have several unique features over the known prior art. One advantage is that the apparatus is capable of controllably distributing a uniform weight or density of granular material onto the surface of an article to be coated.

Another advantage is that a single encloses the granular material to be distributed, such as for example, granular food product. Further, the contra-rotatable distributing augers, which meter the granular food product, are integral with the hopper.

Yet another advantage of the present invention is that the distributing augers are rotatably mounted in side walls of the housing in adjustable eccentric bearings. The eccentric bearings are capable of being rotated a predetermined angle of rotation of raise or lower the height of the distributing augers relative to a pair of elongated slots formed in the hopper housing, which slots are located one under each distributing auger. Thus, by varying the height of the distributing auger, granular food products of various selected sizes can be distributed from the same hopper.

A yet further advantage of the present invention is that the moveable orifice plates, attached to the hopper housing one each adjacent an elongated slot, cooperate with the elongated slots to form an opening therebetween having a variable crossectional area to control the weight per unit area of granular food product to be coated on an article of food.

Another advantage of the present invention is that an agitating auger is rotatably mounted in the hopper housing by means of adjustable eccentric bearings. The bearings permit adjustment of the agitating augers in spaced separation from the distributing augers to accommodate granular food products of various size. The agitating auger functions to separate the granular food products and direct such granular food products toward the distributing augers in a substantially uniform flow independent of the size of the granular food product.

Another further advantage of the present invention is that a desired controlled weight of granular food product can be coated onto the surface of an article food by controlling any one, two or all of conveyor speed, distributing auger and agitating auger height; augers speed of rotation and opening sizes between each of the elongated slots and its respective orifice plate.

Another yet further advantage of the present invention is that a coating conveyor formed of a plurality of parallel disc shaped support members supports articles of food to be coated under the hopper of the distributor enabling excess granular food products failing to coat onto the article to fall between the discs into a reclamation hopper enabling the excess granular food product to be reclaimed and recycled to the hopper for redistribution.

Another advantage of the present invention is that the granular food product is distributed in a continuous distribution pattern having a predetermined weight of granular food product per unit area enabling the weight or density of granular food product actually coated on the surface of an article of food, such as for example shredded cheese or meat pieces being coated onto a pizza shell, to be controllably dependent on the speed at which the article of food is conveyed through the controlled continuous distribution pattern.

BRIEF DESCRIPTION OF THE DRAWING

The above advantages and other advantages of the present invention will become readily apparent when considered in light of the preferred embodiment described herein taken together with the following drawing wherein:

FIG. 2 is a front plan view of the apparatus of FIG. 1;

FIG. 3 is a right plan view of the apparatus of FIG. 1;

FIG. 5 is a partial left end view of the distributor illustrating mounting of the distributing augers and agitating auger in the side wall of the wedge shaped hopper by means of adjustable eccentric bearings;

FIG. 6 is a sectional view of an eccentric bearing taken along lines 6—6 of FIG. 5;

FIG. 7 is a perspective inverted view of the bottom of the hopper housing of the distributor illustrating the pair of parallel elongated slots formed in the bottom of the housing and the pair of moveable orifice plates, one adjacent each slot for forming an opening of controlled size therebetween.

The same numerals are used to designate the same elements in the various figures of the drawing.

Referring now to FIG. 1 of the drawing, the apparatus for coating an article of food with a granular food product at a selected density includes a means for transporting an article of food to be coated along a preselected path at a predetermined speed, such as a wire or chain link conveyor 10 and 12 and a granular food product distributor, generally designated as 14. The articles of food to be coated are shown by dash circles 16 and coated articles of food are shown by dashed circles 18.

Figure 1:
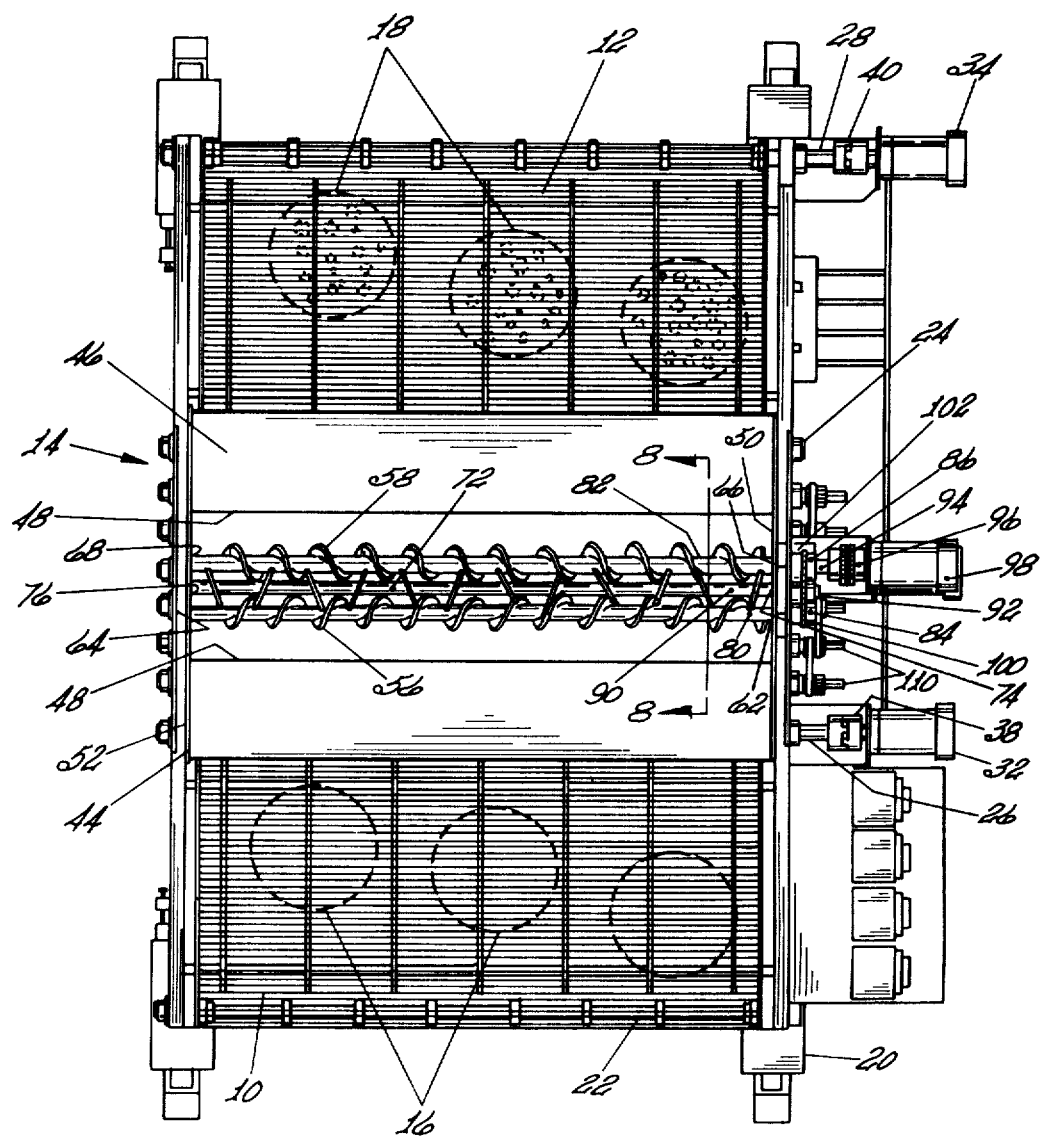
FIG. 1 is a top plan view of the food product coating apparatus.

A support frame 20 supports the chain link conveyors 10 and 12 by means of rotatable link belt conveyor idler shafts 22 and 24, respectively and conveyor drive sprockets 26 and 28, respectively. Chain link conveyors 10 and 12 each have a separate controlled variable speed motor 32 and 34 respectively. Motors 32 and 34 are directly connected to chain link conveyors drive sprockets 26 and 28 respectively via couplers 38 and 40 respectively.

A disc conveyor (shown as 106 and in FIGS. 2 and 4) is located under the distributor 14 and functions to receive uncoated articles of food 16 from chain link conveyor 10, pass the article of food 16 under the distributor for coating, and discharges the coated articles of food onto chain link conveyor 12. Motors 32 and 34 are controlled to transport articles of food along the preselected path of the chain link conveyors 10 and 12 at a predetermined speed determined by motors 32 and 34. The granular food product distributor 14 is capable of dispensing a controlled variable density of granular material onto the surface of an article of food. The distributor 14 comprises a wedged-shaped elongated hopper 44 having an opened end wide top 46 for receiving granular material to be metered therefrom. The hopper has a narrow bottom end 48 which defines a pair of apertures or elongated slots shown in detail in FIG. 7.

The wedged-shaped hopper 44 has a pair of generally planar parallel side walls 50 and 52.

The hopper 44 forms the housing for the distributor 14 and is located in a spaced position above the plane formed by chain link conveyors 10 an 12 and positioned with the pair of elongated slots or apertures positioned substantially perpendicular to the preselected path of the conveyors 10 and 12 to permit the article of food to be passed thereunder.

A pair of axially aligned, contiguous contra-rotatable distributing augers 56 and 58 are rotatably mounted on the side walls 50 and 52 of the hopper 44. The distributing augers 56 and 58 are positioned one above each of the elongated slots formed in narrow end 48 of hopper 44.

The distributing augers 56 and 58 are rotatably mounted or journaled on the side walls 50 and 52. This is accomplished by means operatively coupled to the distributing augers 56 and 58 and mounted on the side walls 50 and 52 of the hopper 44. The adjusting means is capable of selectively adjusting the height of each of the distributing augers 56 an 58 at a selected distance above its respective aperture.

In this embodiment, the distributing augers height adjusting means comprises two sets or pairs of eccentric bearings, one for supporting each end of the distributing auger shaft. Distributing auger 56 is rotatably mounted in eccentric bearings 62 and 64 and distributing auger 58 is rotatably mounted in eccentric bearings 66 and 68. The eccentric bearings 62 and 66 are rotatably mounted in side walls 50 with the centerlines thereof in spaced axial parallel alignment. The distance between the center of the eccentric bearing determines the spaced relationship between the blades on the distributing augers 56 and 58.

The eccentric bearings 64 and 68 are similarly rotatably mounted in side wall 52 of the hopper 44. The eccentric bearings 64 and 68 are rotatably mounted in side wall 52 with the center line of the eccentric bearings in spaced axial parallel alignment. The spacing therebetween is substantially equal to the spacing between center lines of eccentric bearings 62 and 64.

In addition, the eccentric bearings must be in axial alignment with its respective opposite bearing on the opposite side wall. Thus eccentric bearings 62 and 66 in side wall 50 are in axial alignment with eccentric bearings 64 and 68, respectively, in side wall 52.

An agitating auger 72 is rotatably mounted in side walls 50 and 52 with eccentric bearings 74 and 76, respectively. The agitating auger 72 is positioned in spaced parallel alignment above the distributing augers 56 and 58. The eccentric bearings 74 and 76 are adjustable to set the agitating auger at a selected height above the distributing auger 56 and 58.

In the embodiment shown in FIG. 1, distributing augers 56 and 58 and agitating auger 72 each has one of its shaft end 80, 82 and 90 respectively, that is, the end supported by side wall 50, extending through and beyond its respective eccentric bearings mounted in side wall 50. A driven sprocket or drive member 84, 86 and 92 are connected respectively to the end of shafts 80, 82 and 90.

Sprocket 86 on shaft 82 has a drive shaft 94 which extends from sprocket 86 to a coupling drive 96, which is, in turn, driven by a controlled variable speed motor 98. An endless drive chain 100 extends around the periphery of each sprocket 84, 86 and 92 and across an eccentric chain tightener 102.

Eccentric chain tightener 102 is journeled in side wall 50 in a eccentric mounted sprocket. FIG. 5 shows the relationship and adjustable features between the eccentric bearings 62, 66 and 74, sprockets 84, 86 and 92 and the eccentric chain tightener 102.

FIG. 2 illustrates further detail of the apparatus showing frame 20 which supports chain link conveyors 10 and 12, a disc conveyor 106 and hopper support bracket 108. Hopper support bracket 108 supports hopper 44 in a spaced position above the disc conveyor 106. The height is selected to be sufficient to permit articles of food to be transported thereunder.

The disc conveyor 106 has a plurality of spaced parallel shafts 110 extending perpendicular to the preselected path or direction of travel. Shafts 110 are terminated in journaled bearings in a disc conveyor bearing bracket 104. Each shaft 110 has a plurality of spaced parallel disc 116 connected to an rotatable with shafts 110.

Each shaft 110 has an extended end which is connected to a driven wheel 118, which are in turn interconnected by driving belts 120. Driving belts 120 are connceted to and driven by a controlled variable speed disc conveyor drive motor 122.

FIG. 3 shows the mounting of hopper 44 above the preselected path described by chain link conveyor 12 and disc conveyor 106. The height at which hopper 44 is mounted over the disc conveyor 106 located under narrow bottom end 48 of hopper 44 is determined by support bracket 108. The narrow bottom end 48 of hopper 44 defines a pair of aligned elongated slots, 120 and 122 of FIG. 7, having sufficient dimension to permit granular material to pass therethrough. A pair of orifice plates 124 and 126 (FIG. 7) are moveably mounted at the bottom end 48 of the hopper 44, each adjacent to elongated slots 120 and 122, respectively.

Figure 4:
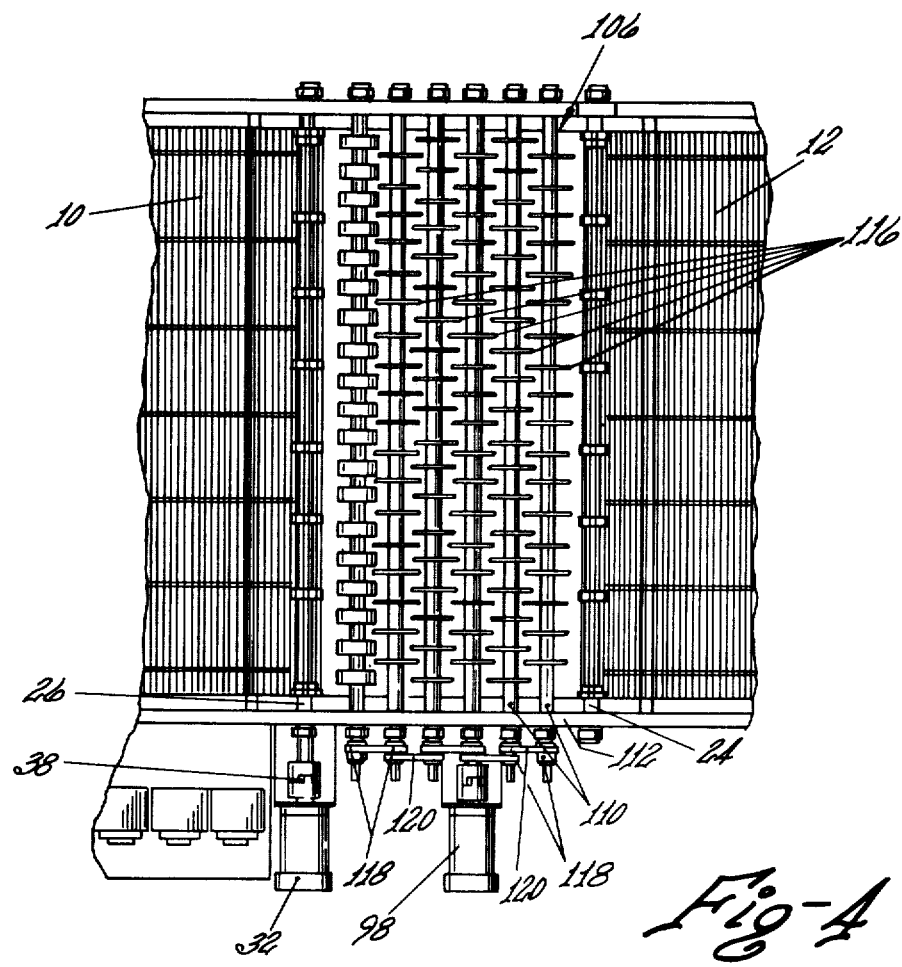
FIG. 4 is a partial top plan view of a link chain conveyor and coating conveyor of the apparatus of FIG. 1 with the distributor removed.

FIG. 4 shows the coating or disc conveyor 106 formed of a plurality of disc shaped support members 116 for supporting and conveying articles of food under the hopper 44. The disc shaped support members 116 are mounted on and rotatable with parallel shafts 110. The spacing between disc shaped support members 116 is sufficient to permit granular food product to pass therebetween. The chain link conveyor 10 delivers uncoated articles of food to the disc conveyor 106 and the chain link conveyor 12 removes coated articles of food therefrom.

Referring again to FIG. 3, located under the disc conveyor 106 and substantially under the granular food product distributor 14 is a means for reclaiming excess granular food product delivered through the elongated apertures and uncoated on an article of food. In this embodiment, the reclamation means is formed of a reclamation conveyor 130 driven by a variable speed motor 132. If desired, the reclamation conveyor 132 conveys the reclaimed material to a return conveyor 134 (shown by dashed lines) to return the excess granular food product to the hopper 44.

Certain details of the apparatus will now be described. FIG. 5 shows, in detail, the relationship between eccentric bearings 62, 64 and 74 relative to each other and to the side wall 50 at the end of hopper 44. The eccentric bearings 62 and 64 rotatably support the distributing auger 52, at shaft end 80, and distributing auger 54, at shaft end 82, respectively. Eccentric bearings 62 and 64 are moveable within side wall 50. Rotation of either one or both of the eccentric bearings effectively moves or adjusts the height of the respective distributing auger a selected distance above the parallel elongated slot located below the distributing auger.

Likewise, eccentric bearing 72 is rotatable within side wall 50 of housing 44 and moves or adjusts the height of the agitating auger 72 via shaft 90 relative to the distributing augers 52 and 54.

Shaft ends 80, 82 and 94 extend through side wall 50, their respective eccentric bearings 62, 64 and 74 and terminate in sprockets 84, 86 and 92 respectively. The endless chain belt 100 extends around the periphery of each sprocket 84, 86 and 92.

In this embodiment, each eccentric bearing can be adjusted via finger grips 136 or with a wrench adapted to engage the finger grips. Alternatively, the eccentric bearing may be adjusted by a hydraulic means, a pneumatic means or some other similar means appropriately attached or coupled to the bearings.

Rotation of an eccentric bearing, for example bearing 86, in a counterclock direction as shown in FIG. 5, urges the shaft end 82 of distributing auger 58 toward the top end of hopper 44 thereby increasing the spaced distance between the distributing auger and its respective elongated slot. In this embodiment, a rotation of 180° effectively displaces the distributing auger a distance equal to the diameter of shaft 82. Of course, the amount of eccentricity determines the displacement or height adjustment range of the distributing auger relative to the shaft.

The height of the distributing auger 56 relative to its elongated slot can similarly be adjusted by rotation of eccentric bearing 62.

The height of the agitating auger 72 can be adjusted relative to the distributing augers 56 and 58 by rotation of eccentric bearing 74.

During rotation of any one, any two or all of the eccentric bearings, the slack in endless chain belt 100 will change due to displacement of sprockets 84, 86 or 92 as the eccentric bearings 62, 64 and 74, respectively, are adjusted. The slack in the endless chain belt 100 is adjusted by means of the eccentric chain tightener 102. The chain tightener 102 is rotatably mounted or journalled in side wall 50 by an eccentric journal 140 fastened to hopper 44 via bolt 142. An eccentric sprocket 144 is mounted onto the eccentric journal 140 and has an outer tooth-shaped periphery having teeth 148 which are adopted to be placed in driven engagement with chain belt 100. Slack is introduced or removed from belt 100 in cooperation with eccentric bearing adjustments. This is accomplished by bolt 142, adjusting the slack in belt 100 by urging the teeth 148 of sprocket 144 into or out of engagement with belt 100, as required. The degree of engagement is determined by rotation of a handle 150 which is integral with and adapted to rotate the eccentric journal 140. Upon obtaining the desired height setting and chain belt adjustment, the bolt 142 is tightened.

It should be noted that FIG. 5 illustrates the eccentric bearings located in side wall 50. However, it is necessary to adjust the height of the augers in side wall 52 by rotating the appropriate eccentric bearing to raise or lower the other opposite shaft end of the adjusted auger as desired.

FIG. 6 is a cross-sectional view showing one of the eccentric bearings 64 which supports shaft end 82 of distributing auger 58. The finger grips 136 are located inward of the bearing and an o-ring groove 152 is provided for receiving an o-ring to form a seal between the shaft 82 and bearing 64.

The ability of adjusting the height of the distributing auger 56 and 58 is one variable in determining the size of granular material and the weight thereof to be dispensed from the distributor 14.

FIG. 7 shows the detail of the elongated slots 120 and 122 located in narrow bottom end 48 of hopper 44. In this embodiment, the bottom end 48 defines the pair of parallel elongated slots 120 and 122. The hopper 44 is mounted relative to the preselected path defined by the chain link conveyors 10 and 12 and disc conveyor 106. Elongated slot 120 is located under and parallel to distributing auger 56 while elongated slot 122 is located under distributing auger 58.

In this embodiment, a pair of elongated slots are disclosed. However, it is envisioned that other sets of apertures or other orifices, such as, for example, segmented slots, may be utilized in practicing this invention.

A pair of elongated, rectangular-shaped orifice plates 124 and 126 are moveably mounted adjacent each elongated slot 120 and 122 respectively. In this embodiment, the orifice plates 124 and 126 have a plurality of spaced elongated openings, generally shown as 158, extending normal to the axis of the slots 120 and 122 and plates 124 and 126. Each opening 158 receives a fastener, generally shown as 160, which is threaded into bottom end 48.

The purpose of the orifice plates 124 and 126 is to controllably vary the cross-sectional area of the opening formed between the elongated slots 120 and 122 and the plates. The desired cross-sectional area is obtained by loosening fastener 160 and sliding plates 124 and 126 to a desired setting relative to orifice guages 162.

When the desired opening area is obtained, the fasteners are re-tightened fixing the opening size.

This size of cross-sectional area of the opening is another variable to determine the density of the granular food product to be coated on the article of food.

It is anticipated that other means may be utilized for varying or selecting the desired cross-sectional area of the elongated slot openings. For example, hydraulic means, pneumatic control means or motor means could be used to controllably vary or select the opening size by adjusting the orifice plate positions or settings.

It is also envisioned that other types of orifices and means for controlling the cross-sectional area thereof could be utilized in practicing the invention. The cross-sectional area of the opening is selected based upon granular size and desired density of granular material per unit area.

Figure 8:
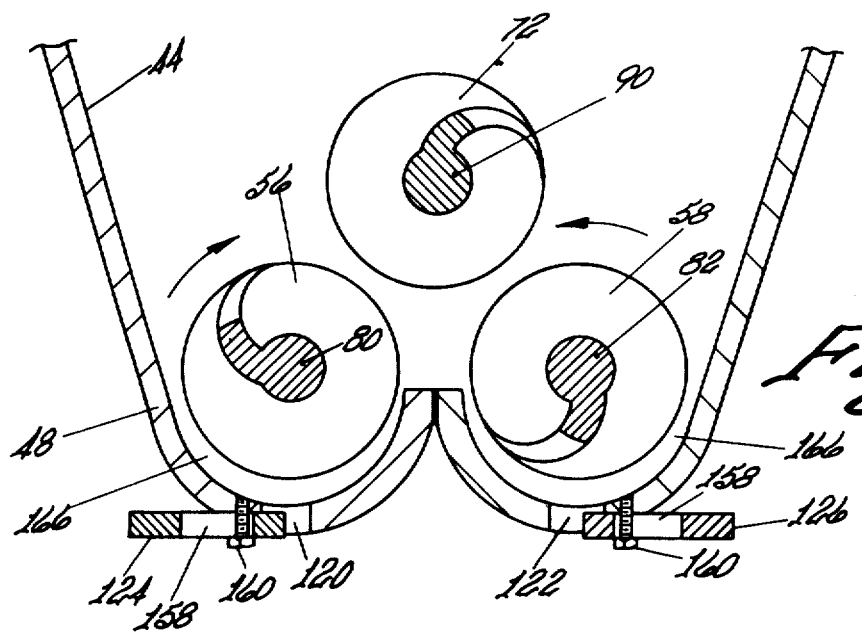
FIG. 8 is a sectional view of the housing forming the distributor hopper taken along lines 8—8 of FIG. 1.

FIG. 8 is a partial cross-sectional view showing the relationship between bottom end 48 of the hopper 44, the distributing augers 56 and 58 and the agitating auger 72. The elongated slots 120 and 122 are located under each distributing auger 56 and 58 respectively. The distance or space between the edge of the blade of distributing augers 56 and 58 relative to slots 120 and 122, respectively, is determined by the settings of eccentric bearings 62 and 64 described in reference to FIG. 5. The cross-sectional area of the openings between slots 120 and 122 is dependent on the settings of the orifice plates 124 and 126 respectively. Rotation of distributing augers 56 and 58 in opposite direction to each other at controlled variable speeds of rotation moves the granular material in a circular motion across each of the elongated slots. The circular motion of the granular food product occurs due to the circular slope 166 of the hopper end 48 relative to the distributing augers 56 and 58 and the stitch and screw surface of distributing augers 56 and 58.

The embodiment disclosed herein is adapted to distribute granular material having a dimension in the order to ¼ inch up to about 1 inch. By controlling the opening size at the bottom of the hopper, the height between the distributing augers and opening, speed of rotation of the distributing augers and speed of the conveyor, the desired density or weight of granular material can be distributed onto articles of food being transported under the distributor. Conveyor speeds in the order of about 6 feet per minute to about 60 feet per minute may be used depending on the application, desired density and other factors.

The agitating auger function to maintain integrity of the granular food material and delivers a continuous flow of material to the distributing augers which, in turn, functions to meter the desired weight of granular material to the elongated slots for dispensing.

Although the disclosure herein is directed to coating controllable weights of granular food products on articles of food, this invention has utility for other application other than as a food product distributor. For example, the present invention may be used to coat granular materials on a flat surface wherein it is desired to control the weight per unit area of the coated surface.

The present invention defines a method of coating a surface of an article with granular food product at selected density comprising the basic steps of: transporting the article to be coated along a preselected path at a predetermined speed; enclosing a quantity of granular material to be coated on said article above the preselected path; agitating the granular material with a height adjustable rotatable agitating auger; metering the granular material through a pair of elongated slots having adjustable orifice plates with a pair of height adjustable centra rotatable distributing augers; adjusting the heights of the agitating auger and distributing augers to obtain a controlled weight of granular material to be metered through the elongated slots, adjusting the orifice plates to set the size of the opening between the elongated slots and orifice plates at a selected cross-sectional area; and rotating the distributing augers and agitating auger at variable selected speed required to meter a selected quantity of granular material through the openings and onto the article being transported therepast at the predetermined speed. Additionally, the steps of reclaiming excess granular material passed through the opening and falling past the article being coated and reconveying the excess granular material back to the enclosed quantity of granular material enables recycling of excess material.

What is claimed is:

1. A method of coating a surface of an article of food with granular food product at a selected density comprising the steps of transporting an article of food to be coated along a preselected path at a predetermined speed;

enclosing a quantity of granular material to be coated on said article of food above said preselected path;

agitating said granular material with height adjustable rotatable agitating auger;

metering said agitated granular material with a pair of height adjustable rotatable distributing augers to a distributing surface forming a pair of elongated parallel slots positioned normal to the preselected path and having an adjustable orifice plate to define an opening between the elongated slot and orifice plate above said predetermined path and through which a metered quantity of granular food material enabling an article of food to be coated to pass thereunder;

adjusting the height of the agitating auger and distributing auger relative to the elongated slots at a selected height to enable a controlled weight of granular material to be metered from the agitating auger to the elongated slots in a circular pattern by said distributing auger;

adjusting the orifice plate to set the opening defined by the elongated slots and orifice plate at selected cross-sectional areas for passing the metered quantity of granular material therethrough at a selected density and onto an article of food located thereunder; and rotating said distributing augers and said agitating auger at a variable selected speed required to meter a selected quantity of granular material through said openings and onto said article of food being transported therepast at said predetermined speed.

2. The method of claim 1 further comprising the steps of reclaiming excess granular material passed through said opening and falling past said article of food being coated; and reconveying excess granular material back to the enclosed quantity of granular material.

* * * * *